March 13, 1945.     D. P. BISBEE     2,371,376
WORK SUPPORT FOR SIDE SEAM WELDING
Filed Nov. 28, 1941     3 Sheets-Sheet 1
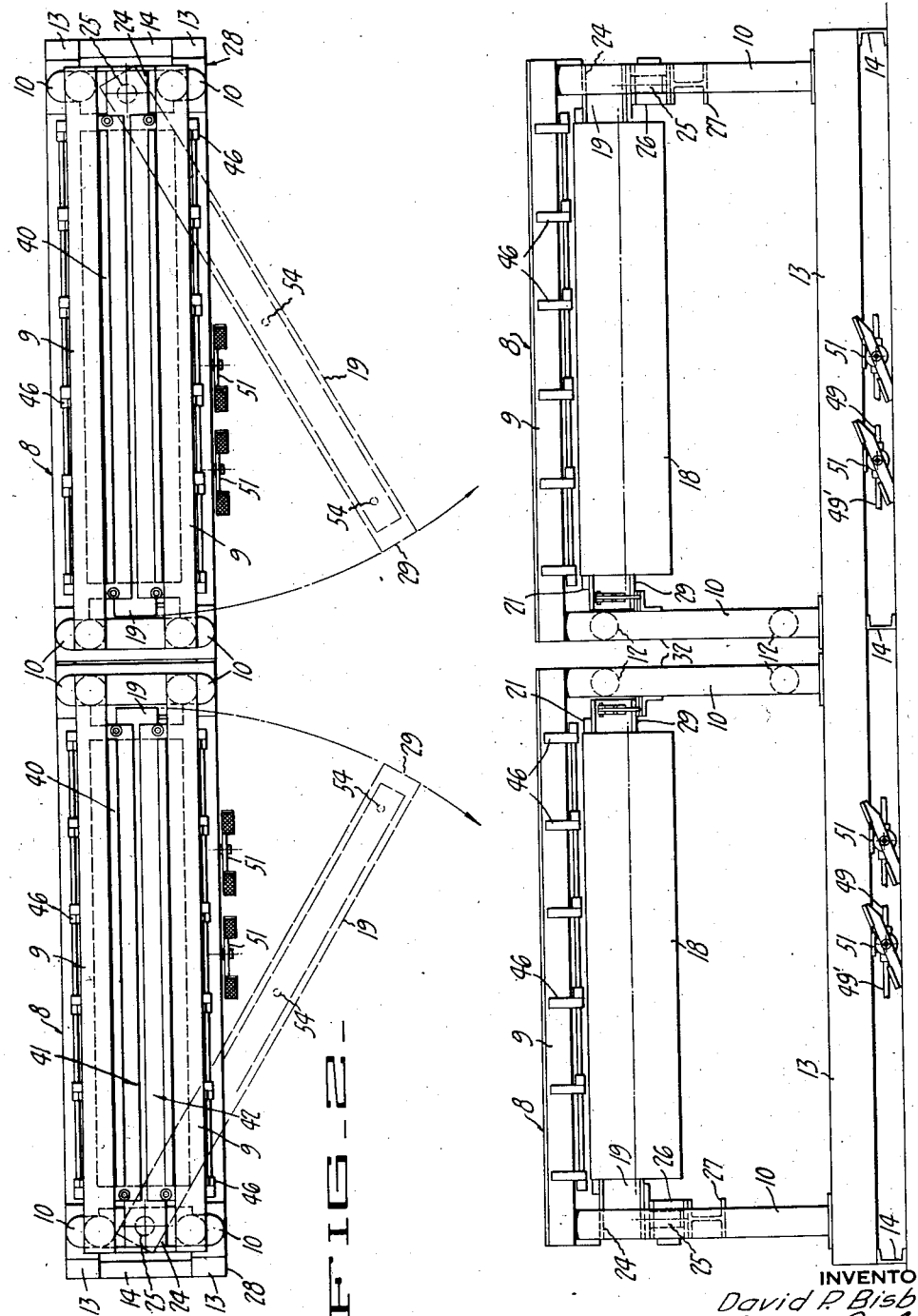
INVENTOR
David P. Bisbee
BY Joseph B. Gardner
his atty.

March 13, 1945.  D. P. BISBEE  2,371,376
WORK SUPPORT FOR SIDE SEAM WELDING
Filed Nov. 28, 1941  3 Sheets-Sheet 2
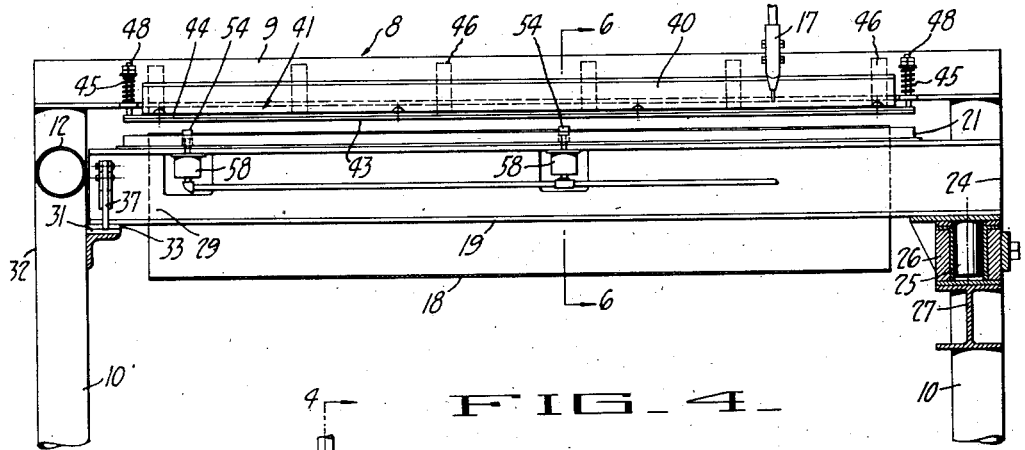
FIG_4_
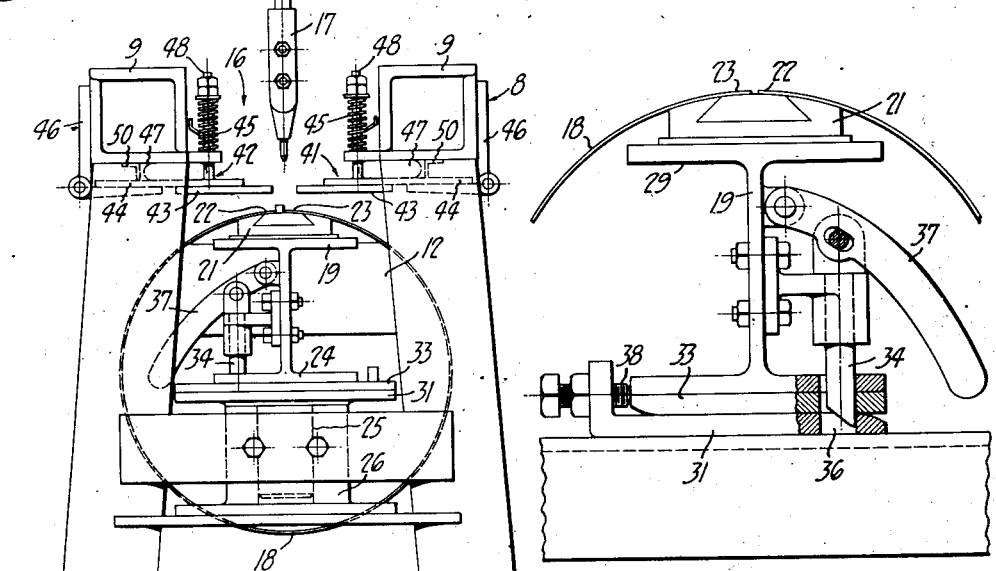
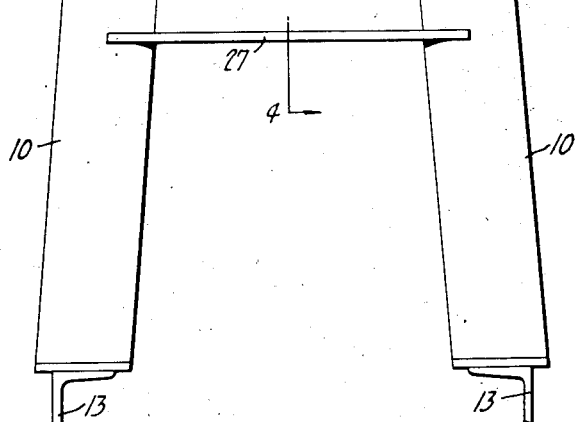
FIG_5_
FIG_3_
INVENTOR
David P. Bisbee
BY Joseph B. Gardner
his atty.

March 13, 1945.　　　　D. P. BISBEE　　　　2,371,376
WORK SUPPORT FOR SIDE SEAM WELDING
Filed Nov. 28, 1941　　　3 Sheets-Sheet 3
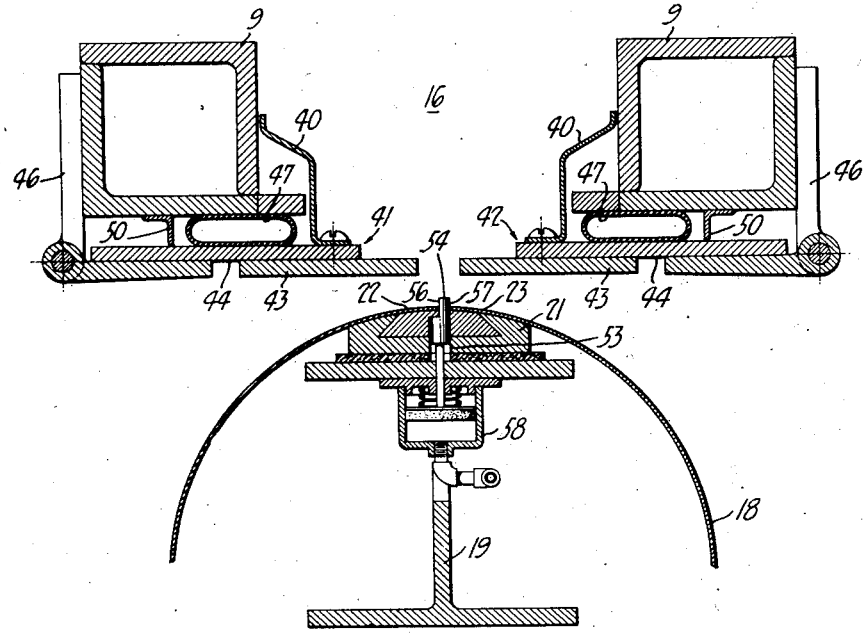
FIG_6_
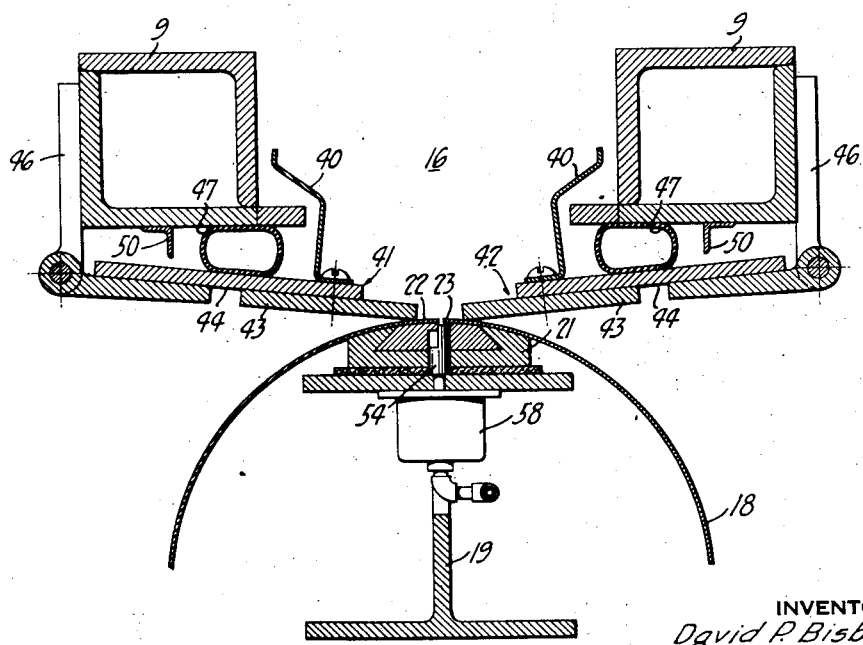
FIG_7_
INVENTOR
David P. Bisbee
BY Joseph B. Gardner
his atty.

Patented Mar. 13, 1945

2,371,376

UNITED STATES PATENT OFFICE 2,371,376

WORK SUPPORT FOR SIDE SEAM WELDING

David P. Bisbee, San Marino, Calif., assignor to Rheem Manufacturing Company, Richmond, Calif., a corporation of California Application November 28, 1941, Serial No. 420,891

2 Claims. (Cl. 113—100)

The invention relates to a means for use in the fabrication of metal drums, tanks, boilers and the like, and particularly in the operation of welding the longitudinal edge portions of the side member in the formation of the seam thereon. More specifically the invention relates to a means of supporting or staking such member with the edge portions thereof held in proper relation to each other and the welding mechanism.

In the manufacture of the metal products of the character referred to, it is customary to form the side member or cylinder by rolling a plate to approximate form and then seaming or joining the longitudinal edges by welding or the like. As will be understood, the edge portions must be firmly held in proper relation during the welding operation. Heretofore as a means of so holding the portions, the latter were as a preliminary to the welding operation proper, tacked together by welding at spaced points. Such tacking, however, possesses certain disadvantages, since not only is it time-consuming, but the final weld or seam is rendered weak at the tacked points. It is therefore an object of my invention to eliminate the necessity of tacking or otherwise securing the portions together as an antecedent to the main welding operation.

Another object of my invention is to provide a means of the character described which will not require the operator to manipulate both edge portions of the side member or cylinder at the same time, but will permit him to place and hold one portion in position without regard to the position of the other.

A further object of the invention is to provide a supporting apparatus of the character described which will permit the operator to place the cylinder in the apparatus, position and hold the edge portions in proper relation for welding, effect the entire welding operation, and then remove the cylinder without requiring the operator to change his position from the front of the apparatus.

A still further object is to so design the apparatus that a pair of units may be associated and handled, by a single operator, whereby the welding operation may continue substantially uninterrupted notwithstanding the continuous removal and replacement of cylinders in the supporting units.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a pair of the units of my invention.

Figure 2 is a plan view of the units as shown in Figure 1.

Figure 3 is an end view of one of the units.

Figure 4 is a vertical sectional view through one of the units, the plane of the section being indicated by the line 4—4 of Figure 3.

Figure 5 is an enlarged fragmentary end view of part of a unit.

Figures 6 and 7 are enlarged sectional detail views of the unit taken on the line 6—6 of Figure 4, respectively showing the parts before and after the work is staked for the welding operation.

In the embodiment of my invention illustrated in the drawings, the supporting and staking apparatus is particularly designed for use in welding the side seam of a cylinder arranged to form the side walls of a range boiler. In the drawings, two units of the apparatus are shown coupled together in end to end relation in order to obtain the efficient and continuous operation referred to and which will be more fully hereinafter explained.

Each unit includes a frame 8 comprising parallel top rails 9 mounted upon legs 10 secured together by spacers 12. The legs of the two units are set upon and secured to sills 13 which underlie both units and thereby firmly hold the units in the coupled relation aforesaid. The sills are supported on bed plates 14.

The rails 9 define in part what may be termed a horizontal passage or way 16 which is open at the top. The way is designed for the reception and the traverse therethrough of a welding head 17 of a suitable welding apparatus (not shown) which may be mounted to move through the way and operated automatically or manually.

The work, that is the cylinder 18 which is to be welded, is arranged to be disposed horizontally in the apparatus, and as a means of supporting the cylinder in this position, there is provided a beam 19 which is carried by the frame and over which the cylinder is inserted. The beam 19 is arranged to extend horizontally within the frame under the way 16 and is provided at the top with a grounded back-up plate 21 which is designed to form the bottom of the way and is desirably made long enough to extend from end to end of any cylinder which may be placed in the stake. The plate is formed of copper or other appropriate electric conducting material, and is arranged to engage the inside surface of the side edge portions 22 and 23 of the cylinder which are to be seamed together.

As will be understood, the cylinder is arranged to be positioned on the beam or removed therefrom by being inserted or withdrawn over an end of the beam, and for this reason if the beam is maintained stationary in the frame the cylinder could be withdrawn from or replaced on the beam only from an end of the frame. Since the operator may effect the entire welding operation of the seam by remaining exclusively on one side of the frame, it is obviously of advantage to enable the operator to remove and replace the cylinder without requiring him to proceed to one or the other end of the frame in order to accomplish such change. In view of this, I have so mounted the beam that the operator may effect the removal and replacement of the cylinder by remaining stationed at the same side of the frame as for effecting the welding operation. To accomplish this object I provide for the moving of the beam from its normal or operative position under the welding head or way so as to position and expose an end of the beam at the side of the apparatus and free and clear of the frame structure thereat. In the present embodiment of the invention, this is accomplished by supporting the beam in the frame for pivotal movement about a vertical axis so that one end may be swung horizontally outward through and beyond the side of the frame. By reference particularly to Figure 4 of the drawings, it will be seen that one end 24 of the beam is provided with a vertically disposed pivot pin 25 which is mounted in a bearing 26 secured on a cross member 27 and located at an end 28 of the frame. The pivotal axis of such pin is vertically aligned with the welding way and normally, that is for the welding operation, the entire beam will be in vertical registration with the way. However, as will be evident, the free end 29 of the beam may be swung outwardly as indicated in Figure 2, so that the cylinder may be easily removed or replaced on the beam from the side of the frame.

As will be clear, in order that the cylinder may be readily inserted over or removed from the beam, the latter must be free and clear of any obstructions or support except for its pivoted end, and in order that the beam will be more firmly supported during the welding operation, a plate 31 is provided on the frame at the end 32, upon which a shoe 33 fixed to the end 29 of the beam is arranged to engage and rest when the beam is in operative relation to the way. The beam may be locked in such position by means of a bolt 34 which is arranged to engage in a hole 36 in the plate 31. The bolt may be released by means of a lever 37 loosely pivoted thereto and fulcrumed to the beam, such lever also serving as a convenient means for the operator for gripping the beam and moving it in or out of the frame. Preferably an adjustable stop 38 is provided at the rear end of the plate 31 so as to limit the inward movement of the beam and enable the operator to more easily return the beam to its normal position.

As previously explained, greater efficiency is had by coupling a pair of units in end to end relation and in this connection, the ends of the way in each unit are left open so that the welding member may pass from one way to the other without interruption of movement or change in position. As will be clear from Figure 2, the beam in each unit is designed to swing outwardly through the corresponding sides of the respective frames, but instead of both beams being pivoted at the corresponding ends of the units, they are pivoted at the free or remote ends of the units. By reason of this mounting the operator may remove or replace the cylinders on both beams without having to move any appreciable distance from one unit to the other. In other words, the operator may perform all such operations by remaining at the center of the coupled units. With this arrangement, the operator may utilize practically all of his time in performing the various operations and he will not be required to stop the welding operation in order to effect the loading or unloading of the cylinders on the beams, or vice versa, interrupt the loading or unloading operation in order to continue to the welding operation.

In the operation of this type of welding stake, the welding mechanism associated with the head is usually suspended and guided over the stake so that the welding electrode will be moved through the way in operative relation to the work positioned therein. With such an arrangement, assuming that the head is at the extreme right of the apparatus as viewed in Figure 2, and that a cylinder is mounted on the beam in the unit to the right in position for welding, the operator will start the welder moving to the left. While the welder is thus advancing at an appropriate speed set by the operator, the operator withdraws the beam from the unit at the left and places thereon a cylinder and returns the beam for the welding operation. The operator then returns to the welder and when the latter has passed over and completed the operation on the cylinder in the unit on the right and has started operating on the cylinder in the unit at the left, the operator thereupon releases and withdraws the beam of the unit on the right and after removing and replacing cylinders thereon, returns the beam to position for the welding operation. He then returns to the welder and upon completion of the welding operation in the cylinder in the unit at the left, moves the welder clear back to the original position at the outer end of the unit on the right. The process is then repeated, with the addition of removing the cylinder from the unit on the left.

It will be understood that when the cylinder is rolled into form, the longitudinal edge portions will seldom if ever be in proper relation for welding a seam thereat, and furthermore even if the cylinder was formed with the edges properly spaced or positioned, the material would not be stiff enough to retain such positioning during the welding operation. It is for this reason that the preliminary tacking operation has been heretofore usually resorted to. It is therefore an important part of my invention to provide for method and means of positioning and retaining the edge portions 22 and 23 of the cylinder in proper relation for the welding operation. As will be understood, the cylinder is positioned on the beam with the said edge portions disposed over the plate 21 and in accordance with my invention not only may such portions be readily placed and retained in proper relation to each other without resorting to a preliminary tacking, but the portions will be held in position for operation by the welder for closing up the seam between such portions. In brief I accomplish the above by providing at the opposite sides of the way, clamping members 41 and 42, one of which is arranged to engage one of said edge portions, while the other is arranged to engage the other edge portion, the members being independently actuable so that one of the members may be operated to clamp one of the portions in position before or without the other member being caused to engage the work.

As is probably best illustrated in Figures 6 and 7, these clamping members each comprise a strip 43 extending preferably substantially for the length of the welding way and mounted above the plate 21 for movement to and from such plate so that the edge portions of the cylinder may be clamped against the plate. The strip 43 as here shown, is carried by a bar 44 which is hinged to an ear 46 secured to the frame rail 9, the hinge axis being parallel to the welding way. The strips are held in upper or inoperative position by means of springs 45 mounted upon bolts 48 fixed to the bars 44. For moving each of the clamping strips to engage the cylinder portions and to hold the same against the back-up plate 21, there is provided between the bar 44 and the associated rail 9, a flexible air conduit 47 which is connected to a source of air under pressure so that the conduit may be inflated to thereby force the strip against the plate. The flow of air to and from the conduits is had through pipes 49 and 49', and the control thereof is afforded through means of foot operated valves 51 conveniently positioned near the bottom of the frame and centrally at the side thereof. A separate control is provided for each clamp.

In positioning the parts for the welding operation after a cylinder has been placed upon the beam and the latter held in normal position in the way, the operator will manipulate the cylinder so that, as shown in Figure 6, one of the side edges is about at the center of the back-up plate and true with the axis of the way. He will then operate the valve which controls the clamp positioned over the portion of the cylinder having said edge so as to cause the clamp to engage and hold such portion against the plate. While the clamp is so held, the operator then manipulates the other edge portion of the cylinder so as to bring the edge thereof in parallel and close relationship to the clamped edge, but with a small space therebetween throughout the length of the cylinder. He then operates the other valve so as to cause the second clamp to engage and hold the associated cylinder portion. With both edge portions thus held in proper position, the operator may then apply the electrode to the edges so as to weld the seam. When the welding has been completed, the valves may be simultaneously operated to release the cylinder so that the beam may be swung outwardly and the cylinder removed.

Preferably, the strip portions of the clamps are formed of relatively thin copper plate so as to render them relatively flexible and thereby easily conformable to any irregularities in the surface of the cylinder portions engaged by the strips. In this way a better and more effective clamping engagement is afforded with less pressure exerted by the clamps. A shield 40 is secured to each clamp for protection of the conduits 47, and stops 50 are positioned between the clamps and the rails so as to limit the upward movement of the clamp as well as also to protect the conduit.

If desired and as here shown, the beam may be provided with a means for positively insuring the accurate positioning of the edge portions on the back-up plate. Mounted in the plate in openings 53 thereof, are a set of stops 54 which may be positioned to extend upwardly from the arcuate upper surface of the plate or be withdrawn entirely below such surface. When the stops are in extended position, corresponding sides 56 thereof define a line parallel to or common with the longitudinal axis of the way or of the plate. In this way by positioning the edge of portion 22 against the sides 56, as clearly shown in Figure 6, and then clamping the strip 43 upon such portion, the proper positioning of such portion will be had with very little effort or skill on the part of the operator. When the portion 22 has been thus clamped, the stops may be retracted as shown in Figure 7, so that the operator may position the portion 23 upon the plate in the desired relation to the edge portion 22. In some instances the stops may be used to locate both edges, that is the rear side 57 of the stops may be used to position the portion 23, while sides 56 position the portions 22. This method would probably be most practical where the width of the seam is not a primary factor.

Retraction and extension of the stops 54 may be effected in any desired manner. As here shown, the stops are connected to pistons mounted in air cylinders 58, the cylinders being connected to cause corresponding movement of the different pistons.

While I have here shown and described the apparatus of my invention as applied for making a butt weld, it will be of course understood that the apparatus may be used to stake the cylinder portions for other types of welds, particularly a lap weld.

I claim:

1. A side-seam welding stake for a hollow cylinder or the like, comprising a frame providing a horizontally extending welding way open at the upper side, a cylinder supporting beam having a back-up plate arranged to form the bottom of said way and engage the inner side of the cylinder edge portions to be welded, abutment members mounted on said plate for engaging the edges of one of said portions to position the same on said plate, remote control means to project or retract said abutment members on the plate, and means at each of the opposite sides of said way arranged for operation independent of each other for clamping said cylinder portions against said plate for the welding operation.

2. A side-seam welding stake for a hollow cylinder or the like comprising, a frame with a pair of parallel horizontally aligned rails at the top, a horizontally extending cylinder supporting beam carried by said frame below said rails arranged for positioning within the cylinder and having at the top thereof a back-up plate for engagement with the inner side of the cylinder edge portion arranged to be welded, clamping members mounted on said rails for movement to or from said plate to hold or release said portions against the plate and including relatively flexible strips substantially coextensive with said plate and arranged to engage said portions, a flexible air conduit operatively positioned between each clamping member and rail and serving on inflation to move said members to clamp said portions against the plate, means to control the flow of air through said conduits independently of each other, and means to retract the clamping members when the conduits are deflated.

DAVID P. BISBEE.